United States Patent [19]

Peters et al.

[11] Patent Number: 4,965,337

[45] Date of Patent: Oct. 23, 1990

[54] VERY HIGH HEAT THERMOPLASTIC POLYETHERIMIDES CONTAINING AROMATIC STRUCTURE

[75] Inventors: Edward N. Peters, Lenox; Dana Bookbinder, Pittsfield, both of Mass.; James A. Cella, Clifton Park, N.Y.

[73] Assignee: General Electric Company, Pittsfield, Mass.

[21] Appl. No.: 303,988

[22] Filed: Jan. 30, 1989

Related U.S. Application Data

[63] Continuation of Ser. No. 140,223, Dec. 31, 1987, abandoned.

[51] Int. Cl.$^5$ .................. C08G 69/26; C08G 8/02
[52] U.S. Cl. .................. 528/353; 528/125; 528/126; 528/128; 528/172; 528/184; 528/185
[58] Field of Search .............. 528/353, 125, 126, 128, 528/172, 184, 185

[56] References Cited

U.S. PATENT DOCUMENTS

| | | | |
|---|---|---|---|
| 3,803,085 | 4/1974 | Takekoshi et al. | 528/26 |
| 3,833,544 | 9/1974 | Takekoshi et al. | 528/26 |
| 3,847,867 | 11/1974 | Heath et al. | 528/128 |
| 3,905,942 | 9/1975 | Takekoshi et al. | 528/179 |
| 3,972,902 | 8/1976 | Heath | 549/241 |
| 3,983,093 | 9/1976 | Williams, III et al. | 528/353 |
| 3,989,712 | 11/1974 | Williams, III | 548/461 |
| 3,991,004 | 11/1976 | Takekoshi et al. | 524/847 |
| 3,998,840 | 12/1976 | Williams et al. | 548/462 |
| 4,011,198 | 3/1977 | Takehoshi et al. | 528/26 |
| 4,073,773 | 2/1978 | Banucci et al. | 528/208 |
| 4,324,882 | 4/1982 | Takekoshi et al. | 528/206 |
| 4,417,044 | 11/1983 | Parekh | 528/179 |
| 4,540,748 | 9/1985 | Matzner et al. | 528/125 |
| 4,704,417 | 11/1987 | Bonin et al. | 524/140 |

FOREIGN PATENT DOCUMENTS

257010 11/1969 U.S.S.R. .

OTHER PUBLICATIONS

Takekoshi et al., "Polyetherimides. II. High-Temperature Solution Polymerization", *J. Polymer Science: Polymer Symposium* 74:93–108 (1986).

Takekoshi et al., "Polyetherimides. I. Preparation of Dianhydrides Containing Aromatic Ether Groups", *J. Polymer Science: Polymer Chemistry Edition* 23: 1759–1769 (1985).

Koton, M. M. and Florinski, F. S. (1968) *Zh. Org. Khin.*, 4(5):744.

*Primary Examiner*—John Kight, III
*Assistant Examiner*—P. Hampton Hightower
*Attorney, Agent, or Firm*—Bernard, Rothwell & Brown

[57] ABSTRACT

The present invention relates to a wholly aromatic polyetherimide further containing sulfur containing groups in the backbone of the polyetherimide. The polyetherimide is characterized by extremely high glass transition temperatures, high chemical resistance and thermogravimetric stability.

9 Claims, No Drawings

VERY HIGH HEAT THERMOPLASTIC POLYETHERIMIDES CONTAINING AROMATIC STRUCTURE

This is a continuation of application Ser. No. 140,223, filed Dec. 31, 1987, now abandoned.

BACKGROUND OF THE INVENTION

As the cost associated with production of machined metal parts has increased over the years, many manufacturers have turned to the use of thermoplastic parts. Thermoplastic parts, unlike metal, can be easily molded into very intricate shapes which are more economical to manufacture. In addition, the resulting parts are generally lighter in weight than a machined metal part. One problem associated with the use of thermoplastic parts is their general lack of high heat resistance, lack of good impact strength and being subject to the natural elements.

One thermoplastic which has been very successful as a substitute for metal is polyetherimide. Polyetherimides are commercially sold by General Electric Company under the trademark Ultem ®. A polyetherimide that is sold under the Ultem ® trademark is derived from bisphenol A dianhydride and m-phenylene diamine. Whereas, the principal uses for this polyetherimide include applications in automotive, aerospace and electrical, there are still some applications which metal is still preferred from a performance standpoint. In response to this need, extensive research and development has occurred in areas of polymer alloys or polyetherimide blends such as polyetherimide/polycarbonate blends; polyetherimide/polyterephthalate-carbonate/-polyester blends; and polyetherimide/fluorinated polyolefin blends. Unfortunately, the current polyetherimides and the polyetherimide blends still lack some properties, namely, thermal resistance, chemical resistance and impact, which may result in an inferior product.

Therefore, there exists a need for a thermoplastic polymer which has high thermal stability, high mechanical strength and high chemical resistance which can be used as a replacement for metal.

SUMMARY OF THE INVENTION

This invention relates to a novel class of polyetherimides having an aromatic structure and containing sulfone linkages. These polyetherimides have extremely high heat resistance and chemical resistance.

DETAILED DESCRIPTION OF THE INVENTION

The present invention relates to a novel class of polyetherimides which are characterized by high chemical resistance, high heat resistance and excellent thermooxidative stabilities.

The polyetherimides of the present invention are of the formula

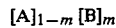

where the mole fraction of m represents a number from 0 to 0.75. Preferably, m ranges from 0 to 0.50 and more preferably from 0 to 0.30.

The A units consist of the formula:

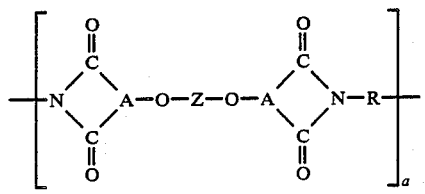

where a represents a whole number in excess of 1, e.g., 10 to 10,000 or more, the group

is selected from

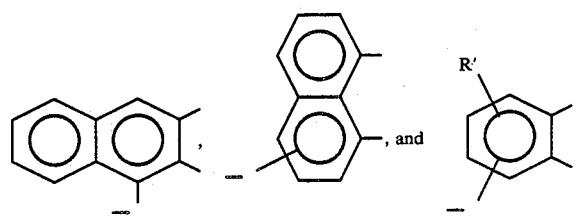

R′ being hydrogen, and the divalent bonds of the —O—Z—O— radical are in the 3,3′; 3,4′; 4,3′ or the 4,4′ position; Z is a member of the class consisting of (1):

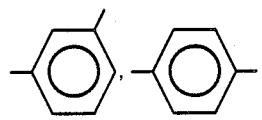

and (2) divalent organic radicals of the general formula:

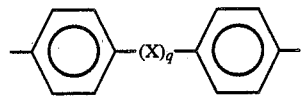

where X is a member selected from the class consisting of divalent radicals of the formulas:

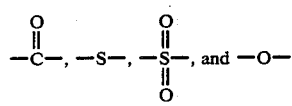

where q is 0 or 1 and R is a divalent organic radical selected from the class consisting of

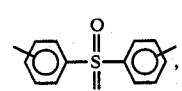

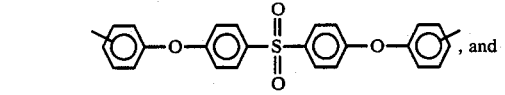

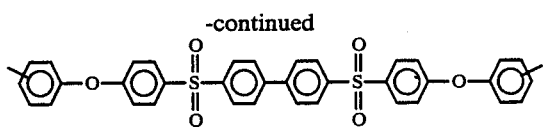

The B units are of the formula:

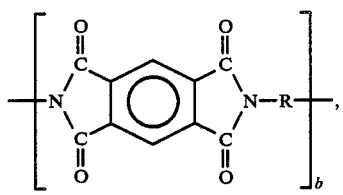   III

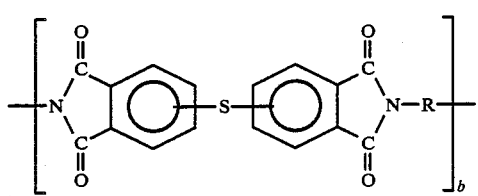   IV

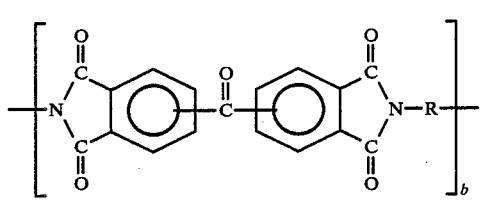   V

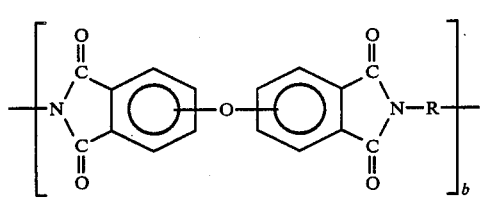   VI

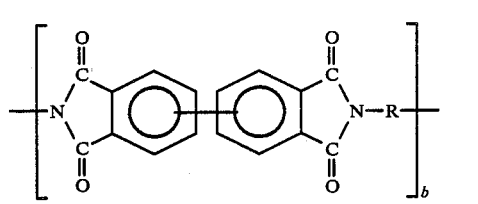   VII

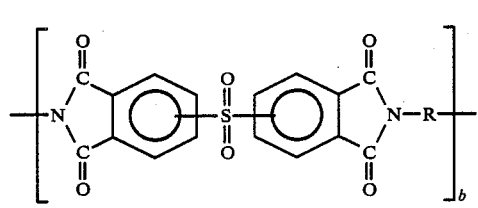   VIII or mixtures thereof, where R is a divalent organic radical as previously defined, and b represents a whole number in excess of 1, e.g., 10 to 10,000 or more.

The polyetherimide of Formula I may consist of from 0 to 50 mol % of the B units with the remaining mol % being provided by the A units. Preferably, the B units consist of from about 0 to about 30 mol % and of the polyetherimide.

The present polyetherimides can be obtained by any of the methods well known to those skilled in the art, including the reaction of an aromatic bis(ether anhydride) of the formula

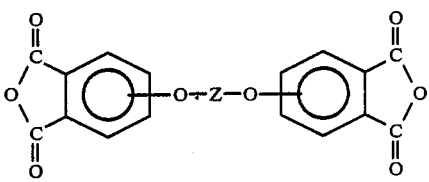   IX where Z is as defined above with an organic diamine of the formula:

$$H_2N-R-NH_2 \quad X$$

where R is as defined above.

If one desires to provide B units to the polyetherimide of Formula I, one should also react, for example, a pyromellitic dianhydride of the formula:

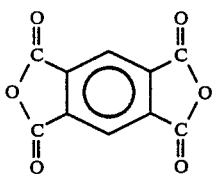   XI or sulfur dianhydride of formula:

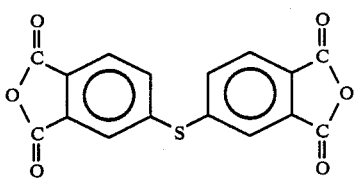   XII or benzophenone dianhydride of formula:

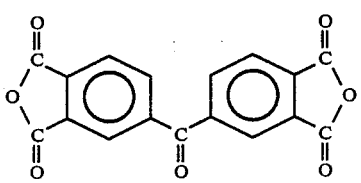   XIII or dianhydrides of the formula:

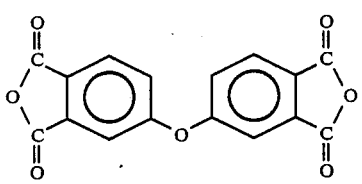   XIV or dianhydrides of the formula:

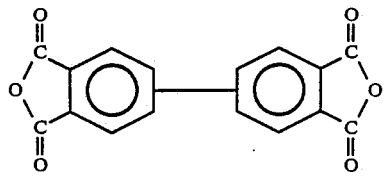

or dianhydrides of the formula:

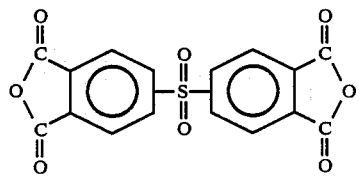

or mixtures thereof. Further, the 4,4'-substituted dianhydrides of Formulas IX, XII and XIII can be replaced by their corresponding 3,3'-, 3',3-, 4',3-substituted dianhydride alternatives. Methods for the preparation of IX and XIII above, respectively, are disclosed in U.S. Pat. No. 3,847,867 and U.S. patent application Ser. No. 346,470, filed Mar. 30, 1973, all assigned to the assignee of this invention. The dianhydride of Formulas XI and XIII are readily available from E.I. DuPont de Nemours & Co. of Wilmington, Delaware and Gulf Chemical respectively.

Aromatic bis(ether anhydride)s of formula IX include for example, 4,4'-bis(2,3-dicarboxyphenoxy)biphenyl dianhydride, 4,4'-bis(2,3-dicarboxyphenoxy)diphenyl ether dianhydride; 1,3-bis(2,3-dicarboxyphenoxy)benzene dianhydride; 4,4'bis(2,3-dicarboxyphenoxy)diphenyl sulfide dianhydride; 1,4-bis(2,3-dicarboxyphenoxy)benzene dianhydride; 4,4'-bis(2,3-dicarboxyphenoxy)benzophenone dianhydride; 4,4'-bis(2,3-dicarboxyphenoxy)diphenyl sulfone dianhydride; 4,4'-bis(3,4-dicarboxyphenoxy)diphenyl ether dianhydride; 4,4'-bis(3,4-dicarboxyphenoxy)diphenyl sulfide dianhydride; 1,3-bis(3,4-dicarboxyphenoxy)benzene dianhydride; 1,4-bis(3,4-dicarboxyphenoxy)benzene dianhydride; 4,4'-bis(3,4-dicarboxyphenoxy)benzophenone dianhydride; and mixtures of such dianhydrides.

Preferably, 100 mol % of Z is of the formula

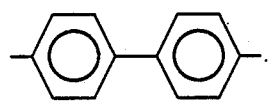

One dianhydride of formula IX which provides this unit to the polyetherimide is 4,4'-bis(2,3-dicarboxyphenoxy)-biphenyl dianhydride also known as biphenol dianhydride.

In addition, aromatic bis(ether anhydride)s also included by formula IX, are shown by Koton, M. M.; Florinski, F. S.; Bessonov, M. I.; Rudakov, A. P. (Institute of Heteroorganic Compounds); Academy of Sciences, U.S.S.R.), U.S.S.R. 257,010, Nov. 11, 1969. Appl. May 3, 1967. In addition, dianhydrides are shown by M. M. Koton, F. S. Florinski, *Zh Org. Khin*, 4(5), 774 (1968).

Organic diamines of formula X include, for example, 4,4'-diaminodiphenyl sulfide; 3,4'-diaminodiphenyl sulfide; 3,3'-diaminodiphenyl sulfide; 4,4'-diaminodiphenyl sulfone; 3,4'-diaminodiphenyl sulfone; 3,3'-diaminodiphenyl sulfone, bis(4-aminophenoxyphenylsulfone) and the like.

In general, the reactions can be advantageously carried out employing well-known solvents, e.g., o-dichlorobenzene, m-cresol/toluene, etc., in which to effect interaction between the dianhydrides and the diamines, at temperatures of from about 100° to about 250° C. Alternatively, the polyetherimides can be prepared by melt polymerization of the above dianhydrides with any of the above diamine compounds while heating the mixture of the ingredients at elevated temperatures with concurrent intermixing. Generally, melt polymerization temperatures between about 200° to 400° C., and preferably 300° to 400° C. can be employed. The conditions of the reaction and the proportions of ingredients can be varied widely depending on the desired molecular weight, intrinsic viscosity, and solvent resistance. In general, equimolar amounts of diamine and dianhydride are employed for high molecular weight polyetherimides, however, in certain instances, a slight molar excess (about 1 to 5 mol percent) of diamine or dianhydride can be employed resulting in the production of polyetherimides having terminal amine or dianhydride groups. Generally, useful polyetherimides have an intrinsic viscosity [η] greater than 0.2 deciliters per gram, preferably 0.35 to 0.80 deciliters per gram or even higher when measured in m-cresol at 25° C.

In preparing the polyetherimide of the present invention, one may include in the reaction mixture a chain stopping agent such as a monofunctional aromatic amine such as aniline or monoanhydride such as phthalic anhydride. The chain stopping agent is generally present in the amount of from about 1 to about 7 mol percent of the total anhydride or amine reactants.

In addition to the polyetherimides, the present invention also includes polyamic acids of the formula:

$$[A]_{1-m}[B]_m \qquad I$$

where m is as described above.

The A units consist of the formula:

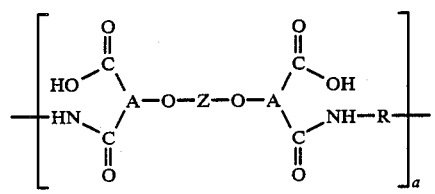

and the B units consist of the formula:

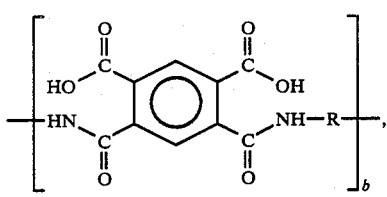

-continued

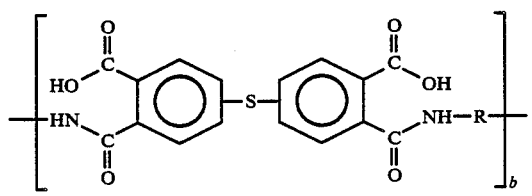
XIX

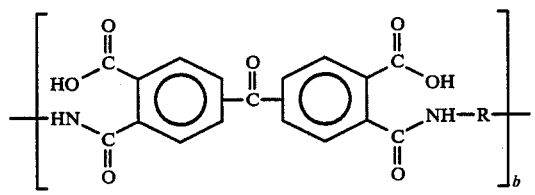
XX

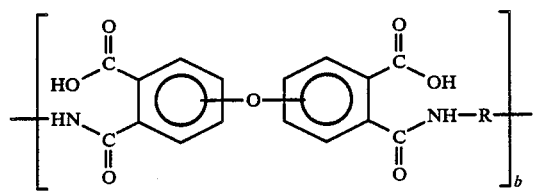
XXI

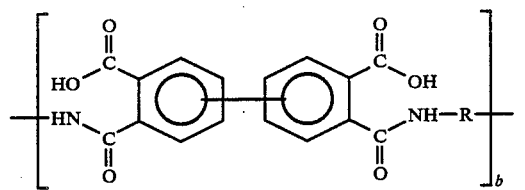
XXII

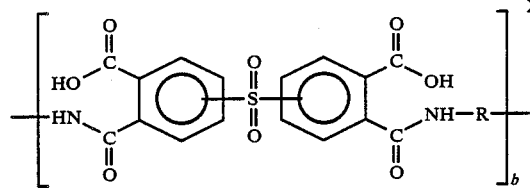
XXIII or mixtures thereof, where the group —O—A<, Z, X, q, R, a and b are as previously defined.

The polyetherimide of the present invention has applications in a wide variety of physical shapes and forms, including the use as films, molding compounds, coatings, etc. When used as films or when made into molded products, the polyetherimide of the present invention, including laminated products prepared therefrom, not only possess good physical properties at room temperature, but they retain their strength and excellent response to workloading at elevated temperatures for long periods of time. Films formed from the polyetherimide of this invention may be used in application where films have been used previously. Thus, the blends of the recent invention can be used in automobile and aviation applications for decorative and protective purposes, and as high temperature electrical insulation for motor slot liners, transformers, dielectric capacitors, coil and cable wrapings (form wound coil insulation for motors), and for containers and container linings. The polyetherimide can also be used in laminated structures where films or solutions of the polyetherimide is applied to various heat-resistant or other type of materials such as asbestos, mica, glass fiber and the like, the sheets superimposed one upon the other, and thereafter subjecting the sheets to elevated temperatures and pressures to effect flow and cure of the resinous binder to yield cohesive laminated structures. Films made from the present invention can also serve in printed circuit applications.

Alternatively, solutions of the polyetherimides herein described can be coated on electrical conductors such as copper, aluminum, etc., and thereafter the coating conductor can be heated at elevated temperature to remove the solvent and provide a continuous resinous composition thereon. If desired, an additional overcoat may be applied to such insulated conductors including the use of polymeric coatings, such as polyamides, polyesters, silicones, polyvinylformal resins, epoxy resins, polyimides, polytertrafluoroethylene, etc. The use of the present invention as overcoats on other types of insulation is not precluded.

Other applications which are contemplated for these blends include their use as binders for asbestos fibers, carbon fibers, and other fibrous materials in making brake linings. In addition, molding compositions and molded articles may be formed from polyetherimides of the invention by incorporating such fillers as asbestos, glass fibers, talc, quartz powder, finely divided carbon, silica, mica and the like into the polyetherimides prior to molding. Shaped articles may be formed under heat, or under heat and pressure, in accordance with practices well-known in the art.

The following examples illustrate specific polyetherimides in accordance with the present invention. It should be understood that the examples are given for the purpose of illustration and do not limit the invention.

EXAMPLE 1

A mixture of 699.77 g of 4,4'-bis(2,3-dicarboxyphenoxy biphenol dianhydride (BPDA), 374.22 g of 4,4'diaminodiphenyl sulfone, 20.11 g of phthalic anhydride, 0.16 g of sodium phenylphosphinate (catalyst) and 3000 ml of ortho-dichlorobenzene was heated in a reaction vessel to reflux for 3 hours under nitrogen. A water collection receiver was used to remove water generated from the reaction. The reaction mixture was cooled to 25° C., filtered and dryed under nitrogen at 210° C. for 6 hours. The product was in the form of a powder. The above procedure was repeated twice and the three powdered products were combined into a single batch. The combined product batch was then extruded in a 28 mm, twin screw Werner & Pfleiderer extruder having a temperature profile of about 390° C. The resulting extrudate was comminuted into ⅛" pellets and the pellets injection molded in a 50 Ton Boy injection molding machine into ASTM test specimens. The properties are listed in Table 1.

EXAMPLE 2

A mixture of 111.68 g of BPDA, 60.38 g 4,4' diaminodiphenyl sulfone, 3.96 g of phthalic anhydride, 0.0260 g of sodium phenylphosphinate, and 300 ml of ortho-dichlorobenzene was heated in a reaction vessel equipped with a dean-stark trap. The mixture was heated to reflux for 3 hours under nitrogen and the water from the reaction was removed. The reaction mixture was then cooled to 25° C., filtered and dried under nitrogen for 4 hours at 210° C. The powdered product was melted and mixed in a Haake bowl at 400° C. for 10 minutes. The intrinsic viscosity and glass transition temperature of the polyetherimide was measured.

The polyetherimide was compression molded at 388° C. and 20,000 psi into 0.125 in plaques for testing. The physical properties are listed in Table I.

EXAMPLE 3

The procedure of Example 2 was repeated except the reaction mixture was made up of the following:

| Chemical | Amount |
|---|---|
| BPDA | 112.2 g |
| 4,4'diaminodiphenyl sulfone | 60.36 g |
| phthalic anhydride | 3.60 g |
| sodium phenylphosphinate | 0.026 g |
| o-dichlorobenzene | 300 ml |

The physical properties of the polyetherimide were measured and are listed in Table 1.

EXAMPLE 4

The procedure of Example 2 was repeated except the reaction mixture was made up of the following:

| Chemical | Amount |
|---|---|
| BPDA | 112.87 g |
| 4,4'diaminodiphenyl sulfone | 60.36 g |
| phthalic anhydride | 3.23 g |
| sodium phenylphosphinate | 0.026 g |
| o-dichlorobenzene | 300 ml |

The physical properties of the polyetherimide were measured and are listed in Table 1.

EXAMPLE 5

The procedure of Example 2 was repeated except the reaction mixture was made up of the following:

| Chemical | Amount |
|---|---|
| BPDA | 113.46 g |
| 4,4'diaminodiphenyl sulfone | 60.36 g |
| phthalic anhydride | 2.88 g |
| sodium phenylphosphinate | 0.026 g |
| o-dichlorobenzene | 300 ml |

The physical properties of the polyetherimide were measured and are listed in Table 1.

EXAMPLE 6

The procedure of Example 2 was repeated except the reaction mixture was made up of the following:

| Chemical | Amount |
|---|---|
| BPDA | 114.05 g |
| 4,4'diaminodiphenyl sulfone | 60.36 g |
| phthalic anhydride | 2.52 g |
| sodium phenylphosphinate | 0.026 g |
| o-dichlorobenzene | 300 ml |

The physical properties of the polyetherimide were measured and are listed in Table 1.

EXAMPLE 7

The procedure of Example 2 was repeated except the reaction mixture was made up of the following:

| Chemical | Amount |
|---|---|
| BPDA | 107.40 g |
| 4,4'diaminodiphenyl sulfone | 56.38 g |
| phthalic anhydride | 1.82 g |
| sodium phenylphosphinate | 0.026 g |
| o-dichlorobenzene | 300 ml |

The physical properties of the polyetherimide were measured and are listed in Table 1.

EXAMPLE 8

The procedure in Example 2 was repeated except the reaction mixture was made up of the following:

| Chemical | Amount |
|---|---|
| BPDA | 113.46 g |
| 4,4'diaminodiphenyl sulfone | 30.18 g |
| 3,3'diaminodiphenyl sulfone | 30.18 g |
| phthalic anhydride | 2.88 g |
| sodium phenylphosphinate | 0.026 g |
| o-dichlorobenzene | 300 ml |

The physical properties of the polyetherimide were measured and are listed in Table 1.

EXAMPLE 9

The procedure of Example 2 was repeated except the reaction mixture was made up of the following:

| Chemical | Amount |
|---|---|
| BPDA | 113.46 g |
| 3,3'diaminodiphenyl sulfone | 60.36 g |
| phthalic anhydride | 2.88 g |
| sodium phenylphosphinate | 0.026 g |
| o-dichlorobenzene | 300 ml |

The physical properties of the polyetherimide were measured and are listed in Table 1.

EXAMPLE 10

The procedure in Example 2 was repeated except the reaction mixture was made up of the following:

| Chemical | Amount |
|---|---|
| BPDA | 50.00 g |
| bis (4-aminophenoxyphenylsulfone) | 47.09 g |
| phthalic anhydride | 1.27 g |
| sodium phenylphosphinate | 0.014 g |
| o-dichlorobenzene | 311 g |

The physical properties of the polyetherimide were measured and are listed in Table 1.

EXAMPLE 11

A mixture of 1250.0 g of BPDA, 656.14 g of 4,4'-diaminodiphenylsulfone, 21.16 g of phthalic anhydride, 0.2891 g of sodium phenylphosphonate and 1498.0 g of N-methylprrolidione were heated and stirred in a reaction vessel for 1 hour at 110° C. whereupon the materials reacted to form a soluble polyamic acid prepolymer. At this stage, this material can be used to coat fillers and fibers such as glass, carbon fiber, mica, talc, etc. To form polymer, the polyamic acid was heated further to 350° C. for 1 hour to form polyetherimide film. The material had a glass transition temperature of 275° C. and intrinsic viscosity of 0.68 deciliters/gram.

EXAMPLE 12

The procedure in Example 2 was repeated except the reaction mixture was made up of the following:

| Chemical | Amount |
| --- | --- |
| 4,4'-bis(2,3 dicarboxyphenoxy) diphenylsulfone dianhydride | 50.00 g |
| 4,4'-diaminodiphenyl sulfone | 23.72 g |
| phthalic anhydride | 0.99 g |
| sodium phenylphosphinate | 0.014 g |
| ODCB | 311 g |
| Intrinsic viscosity- | 0.65 dl/g |
| Glass Transition Temperature- | 291° C. |
| Notched Izod of 1.5 ft. lbs/in | |

The physical properties of the polyetherimide were measured and are listed in Table 1.

EXAMPLE 13

The procedure in Example 2 was repeated except the reaction mixture was made up of the following:

| Chemical | Amount |
| --- | --- |
| 1,4-bis(3,4-dicarboxy)benzene dianhydride | 466.50 g |
| 4,4'-sulfonyldianiline | 297.60 g |
| phthalic anhydride | 16.00 g |
| sodium phenyl phosphinate | 0.8 g |
| o-dichlorobenzene | 2500.00 g |

The physical properties of the polyetherimide were measured and are listed in Table 1.

EXAMPLE 14

The procedure in Example 2 was repeated except the reaction mixture was made up of the following:

| Chemical | Amount |
| --- | --- |
| 1,4-bis(3,4-dicarboxy)benzene dianhydride | 468.90 g |
| 4,4'-sulfonyldianiline | 297.60 g |
| phthalic anhydride | 14.22 g |
| sodium phenyl phosphinate | 0.80 g |
| o-dichlorobenzene | 2500 g |

The physical properties of the polyetherimide were measured and are listed in Table 1.

EXAMPLE 15

The procedure in Example 2 was repeated except the reaction mixture was made up of the following:

| Chemical | Amount |
| --- | --- |
| 1,4-bis(3,4-dicarboxy)benzene dianhydride | 471.40 g |
| 4,4'-sulfonyldianiline | 297.60 g |
| phthalic anhydride | 12.44 g |
| sodium phenyl phosphinate | 0.80 g |
| o-dichlorobenzene | 2500.00 g |

The physical properties of the polyetherimide were measured and are listed in Table 1.

EXAMPLE 16

The procedure in Example 2 was repeated except the reaction mixture was made up of the following:

| Chemical | Amount |
| --- | --- |
| 1,4-bis(3,4-dicarboxy)benzene dianhydride | 473.83 g |
| 4,4'-sulfonyldianiline | 297.60 g |
| phthalic anhydride | 10.66 g |
| sodium phenyl phosphinate | 0.80 g |
| o-diclorobenzene | 2500.00 g |

The physical properties of the polyetherimide were measured and are listed in Table 1.

EXAMPLE 17

The procedure in Example 2 was repeated except the reaction mixture was made up of the following:

| Chemical | Amount |
| --- | --- |
| 1,4-bis(3,4-dicarboxy)benzene dianhydride | 478.71 g |
| 4,4'-sulfonyldianiline | 297.60 g |
| phthalic anhydride | 7.11 g |
| sodium phenyl phosphinate | 0.80 g |
| o-dichlorobenzene | 2500.00 g |

The physical properties of the polyetherimide were measured and are listed in Table 1.

EXAMPLE 18

The procedure in Example 2 was repeated except the reaction mixture was made up of the following:

| Chemical | Amount |
| --- | --- |
| 1,4-bis(3,4-dicarboxy)benzene dianhydride | 464.10 g |
| 4,4'-sulfonyldianiline | 297.60 g |
| phthalic anhydride | 17.77 g |
| sodium phenyl phosphinate | 0.80 g |
| o-dichlorobenzene | 2500.00 g |

The physical properties of the polyetherimide were measured and are listed in Table 1.

EXAMPLE 19

The procedure in Example 2 was repeated except the reaction mixture was made up of the following:

| Chemical | Amount |
| --- | --- |
| 1,4-bis(3,4-dicarboxy)benzene dianhydride | 1683.8 g |
| 4,4'-sulfonyldianiline | 1071.4 g |
| phthalic anhydride | 54.4 g |
| sodium phenyl phosphinate | 2.9 g |
| o-dichlorobenzene | 9000.0 g |

The physical properties of the polyetherimide were measured and are listed in Table 1.

EXAMPLE 20

A series of tests were conducted in order to compare the physical properties of a polyetherimide derived from BPDA and 4,4' diaminodiphenyl sulfone vs. a polyetherimide derived from bisphenol A dianhydride (BPA-DA) and 4,4-diaminodiphenyl sulfone. The solvent resistance as well as other physical properties of each polymer is listed below.

The solubility of the polymer was tested by allowing the polymer to stir in solvent for 7 days at 25° C.

|  | BP-DA/SDAN | BPA-DA/SDAN |
|---|---|---|
| Intrinsic Viscosity, dl/g at 25° C. in phenol/tetrachloroethane | 0.60 | 0.60 |
| Tg° C. | 275° | 240° |
| Solvent Resistance |  |  |
| $CH_2Cl_2$ | insoluble | soluble |
| $CHCl_3$ | insoluble | soluble |
| orthodichlorobenzene | insoluble | soluble |
| N-methypyrrolidione | insoluble | soluble |
| N,N-dimethylacetamide | insoluble | soluble |
| m-cresol | soluble | soluble |

As one can see from the above table, the polyetherimides of the present invention are insoluble in many of the above solvents suggesting a higher chemical resistance to a substantial number of more chemicals than the polyetherimide of the prior art.

A thermal gravimetric analysis was conducted on the two polymers. The analysis was conducted in a Perkin-Elmer TGS-2 Thermogravimetric System. The results are shown below:

|  | BP-DA/SDAN | BPA-DA/SDAN |
|---|---|---|
| 1% weight loss in Air, 5° C./min. scan | 520° C. | 480° C. |
| 1% weight loss in $N_2$, 5° C./min. scan | 540° C. | 490° C. |

The stability of each polymer was measured at 250° C. in an air circulating oven over a period of time. The results are shown below:

|  | 0 hr | 24 hr | 100 hr | 1000 hr | 5000 hr |
|---|---|---|---|---|---|
| BP-DA/SDAN (I.V.) | 0.60 | 0.60 | 0.62 | 0.64 | 0.64 |
| BPA-DA/SDAN (I.V.) | 0.60 | cross-linked | cross-linked | cross-linked | cross-linked |

While the present invention has been described with reference to particular embodiments thereof, it will be understood that numerous modifications may be made by those skilled in the art without actually departing from the spirit and scope of the invention as defined in the appended claims.

TABLE 1

| Property | Example 1 | Example 2 | Example 3 | Example 4 | Example 5 | Example 6 | Example 7 | Example 8 | Example 9 |
|---|---|---|---|---|---|---|---|---|---|
| Intrinsic Viscosity (dl/g) | — | .50 | .57 | .60 | .65 | .75 | .85 | .62 | .65 |
| Tg(°C.) | 273 | 267 | 274 | 277 | 277 | 280 | 283 | 250 | 237 |
| Tensile Strength (psi) | 14,100 |  |  |  |  |  |  |  |  |
| Tensile Elongation (%) | 9.7 |  |  |  |  |  |  |  |  |
| Flexural Strength (psi) | 18,700 | 20,400 |  |  |  |  |  |  |  |
| Flexural Modules (psi) | 405,300 | 400,000 |  |  |  |  |  |  |  |
| Notched Izod (ft-lbs/in) | 2.5 | 1.0 |  |  |  |  |  | 1.1 | .6 |
| Heat Distortion Temperature at 264 psi (°C.) | 250 |  |  |  |  |  |  |  |  |

| Property | Example 10 | Example 13 | Example 14 | Example 15 | Example 16 | Example 17 | Example 18 | Example 19 |
|---|---|---|---|---|---|---|---|---|
| Intrinsic Viscosity (dl/g) | 0.60 |  |  |  |  |  |  |  |
| Tg (°C.) | 236 | 268 | 270 | 269 | 272 | 276 | 267 | 269 |
| Tensile Strength (psi) |  |  |  |  |  |  |  | 15,300 |
| Tensile Elongation (%) |  |  |  |  |  |  |  | 10 |
| Flexural Strength (psi) |  | 18,200 |  | 20,900 |  |  |  | 20,100 |
| Flexural Modules (psi) |  | 367,000 |  | 416,000 |  |  |  | 460,000 |
| Notched Izod (ft-lbs/in) | 2.77 | 0.87 | 0.85 | 0.83 | 1.40 | 0.72 | 0.48 | 0.20 |
| Heat Distortion Temperature |  |  |  |  |  |  |  | 240 |

We claim:
1. A polyetherimide consisting essentially of a polyetherimide of the formula:

$$[A]_{1-m}[B]_m \quad \text{I}$$

where m is a number from 0 to 0.50, where A units are of the formula:

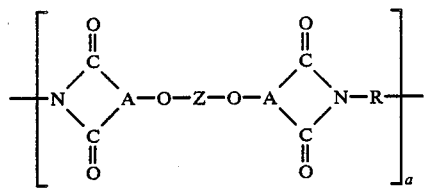

where the group

—O—A< is selected from

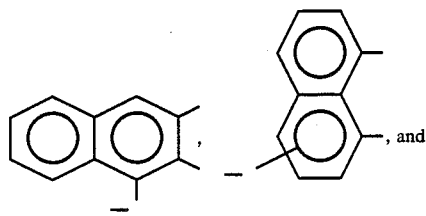

R' being hydrogen; and the divalent bonds of the —O—Z—O— radical are in the 3,3'; 3,4'; 4,3' or 4,4' position; Z is a member of the class consisting of (1):

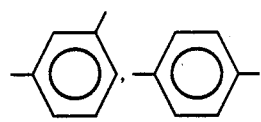

and (2) divalent organic radicals of the general formula:

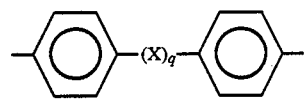

where X is a member selected from the class consisting of divalent radials of the formulas:

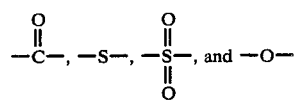

where q is O or 1 and R is a divalent organic radical selected from the class consisting of

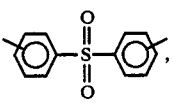

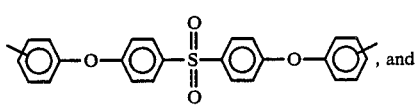, and

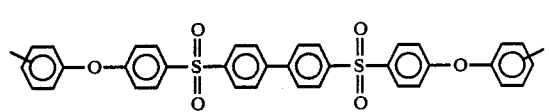

and where the B units are of the formulas:

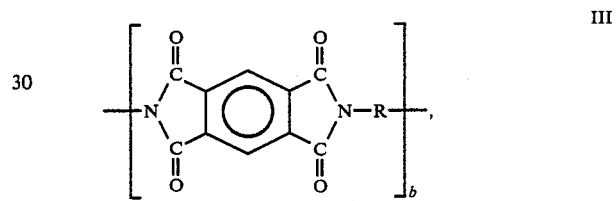

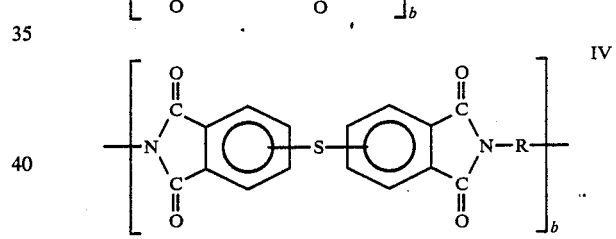

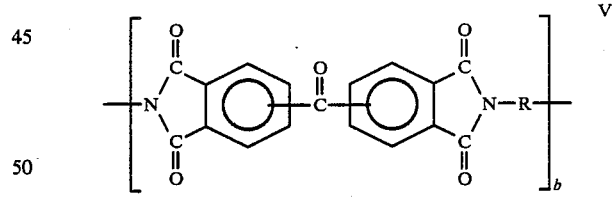

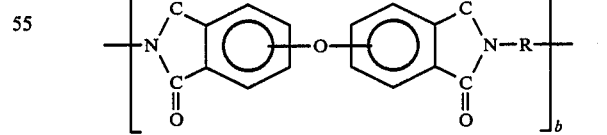

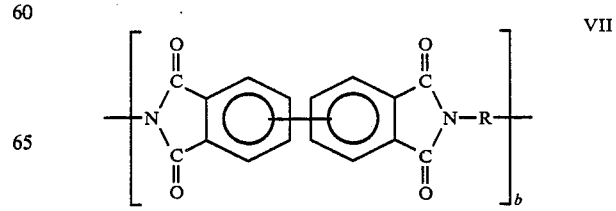

-continued

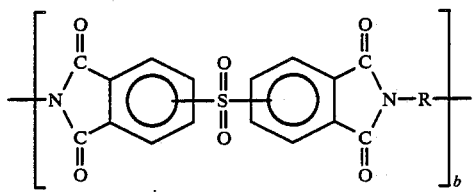

or mixtures thereof, where R is a divalent organic radical as previously defined, and independently a and b represent a whole number in excess of 1.

2. The polyetherimide of claim 1 wherein M is a number from 0 to 0.30.

3. The polyetherimide of claim 1 wherein M is 0, the group

—O—A< is

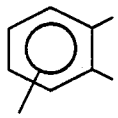

and Z is

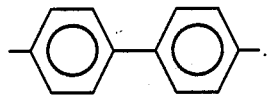

4. The polyetherimide of claim 1 wherein R is

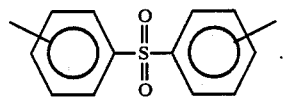

5. The polyetherimide of claim 3 wherein R is

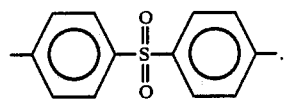

6. The polyetherimide of claim 1 wherein R is

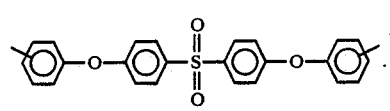

7. The polyetherimide of claim 3 wherein R is

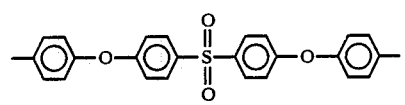

8. The polyetherimide of claim 1 wherein said polyetherimide is blended with asbestos fibers, carbon fibers, asbestos, glass fibers, talc, quartz powder, finely divided carbon, mica and silica.

9. A polyamic acid consisting essentially of a polyamic acid of the formula:

$$[A]_{1-m}[B]_m \quad \text{I}$$

where m is a number from 0 to 0.50, where A units are of the formula:

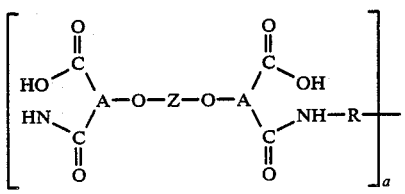

where the group

—O—A< is selected from

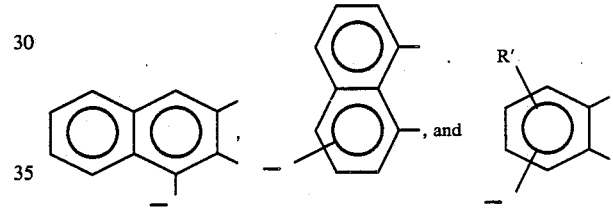

R' being hydrogen; and the divalent bonds of the —O—Z—O— radical are in the 3,3'; 3,4'; 4,3' or 4,4' position; Z is a member of the class consisting of (1):

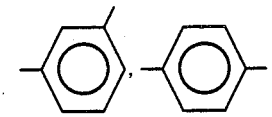

and (2) divalent organic radicals of the general formula:

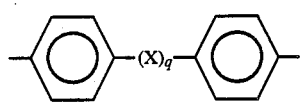

where X is a member selected from the class consisting of divalent radials of the formulas:

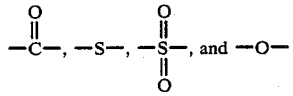

where q is O or 1 and R is a divalent organic radical selected from the class consisting of

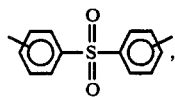
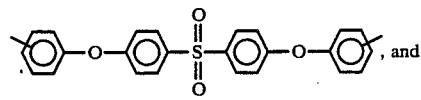
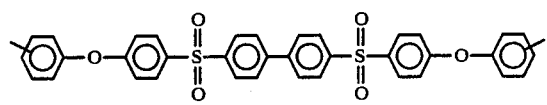
and where the B units are of the formulas:
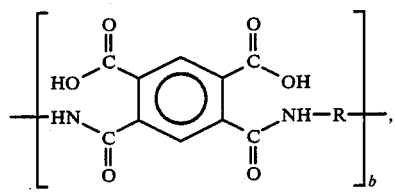
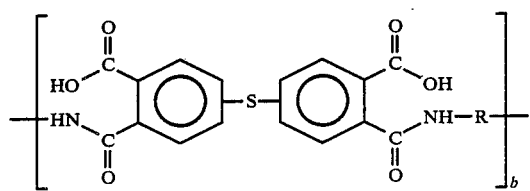
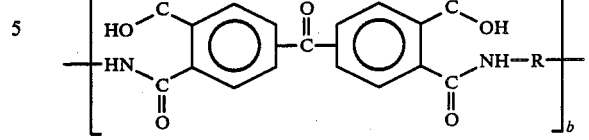
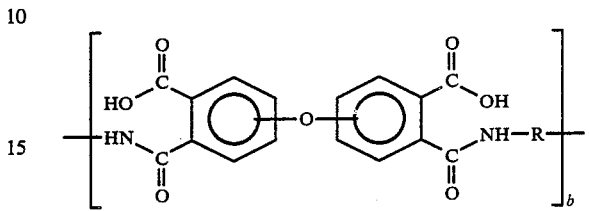
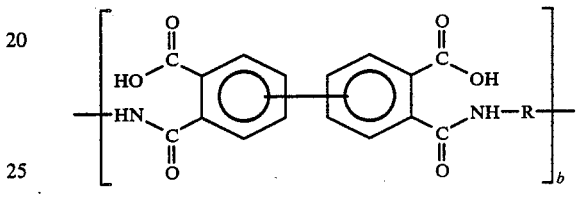
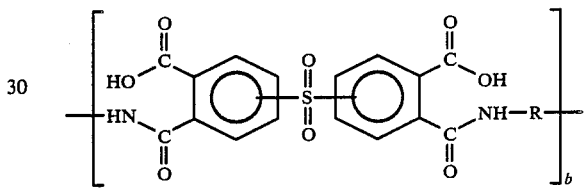
or mixtures thereof, where R is a divalent organic radical as previously defined, and independently a and b represent a whole number in excess of 1.
* * * * *